United States Patent
Hu et al.

(10) Patent No.: US 12,492,703 B1
(45) Date of Patent: Dec. 9, 2025

(54) HANDHELD FAN

(71) Applicant: SHENZHEN MAIYUE INTELLIGENT TECHNOLOGY CO., LTD, Shenzhen (CN)

(72) Inventors: Feng Hu, Shenzhen (CN); Guanghui Hu, Loudi (CN)

(73) Assignee: SHENZHEN MAIYUE INTELLIGENT TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 19/087,518

(22) Filed: Mar. 23, 2025

(30) Foreign Application Priority Data

Nov. 19, 2024 (CN) .......................... 202422830763.0

(51) Int. Cl.
| | |
|---|---|
| *F04D 25/08* | (2006.01) |
| *F04D 25/06* | (2006.01) |
| *H01R 13/66* | (2006.01) |
| *H01R 13/72* | (2006.01) |
| *H02J 7/00* | (2006.01) |
| *A61F 7/00* | (2006.01) |

(52) U.S. Cl.
CPC ....... F04D 25/084 (2013.01); F04D 25/0673 (2013.01); F04D 25/0693 (2013.01); H01R 13/6675 (2013.01); H01R 13/72 (2013.01); H02J 7/00 (2013.01); *A61F 2007/0001* (2013.01); *H02J 7/0048* (2020.01)

(58) Field of Classification Search
CPC ............... F04D 25/084; F04D 25/0673; F04D 25/0693; H01R 13/6675; H01R 13/72; A61F 2007/0001; H02J 7/00; H02J 7/0048
See application file for complete search history.

(56) References Cited

U.S. PATENT DOCUMENTS

| | | | | | |
|---|---|---|---|---|---|
| 5,304,035 | A | * | 4/1994 | Carter ................... | F04D 25/084 362/108 |
| 6,155,782 | A | * | 12/2000 | Hsu ....................... | F04D 25/084 416/246 |
| 6,179,564 | B1 | * | 1/2001 | Park ...................... | F04D 25/084 416/63 |
| 10,658,800 | B1 | * | 5/2020 | Luster ................ | B65H 75/4431 |

(Continued)

OTHER PUBLICATIONS

Halo, 3-1-Mini Fan 3,000mAh Power Bank, Nov. 4, 2024 (Year: 2024).*

*Primary Examiner* — Andrew J Marien

(74) *Attorney, Agent, or Firm* — Zhigang Ma

(57) ABSTRACT

A handheld fan includes a housing, a fan module, a power module, and a retractable cable module. The fan module is disposed in the housing, the power module is disposed in the housing and configured to supply power to the fan module, the retractable cable module is disposed in the housing and includes a cable retractable relative to the housing to be withdrawn into the housing or extended out of the housing, and the cable is configured to connect to an external electronic device, and supply power to the external electronic device through the power module. When a user carries the handheld fan and has a charging need, the cable is capable of being pulled out of the housing of the handheld fan, and connected to the external electronic device including a mobile phone. The power module is configured to supply power to the external electronic device.

24 Claims, 13 Drawing Sheets

(56) References Cited

U.S. PATENT DOCUMENTS

| | | | | |
|---|---|---|---|---|
| 12,229,070 B2* | 2/2025 | Bennion | ............ | G06F 13/4282 |
| 2008/0101928 A1* | 5/2008 | Chen | .................... | F04D 25/084 |
| | | | | 415/213.1 |
| 2009/0079392 A1* | 3/2009 | Wu | .................... | H01M 10/425 |
| | | | | 320/127 |
| 2020/0388972 A1* | 12/2020 | Byrne | .................... | H01R 31/06 |
| 2020/0412145 A1* | 12/2020 | Rosenthaler | .... | H04M 1/724094 |
| 2025/0146496 A1* | 5/2025 | Zheng | .................. | F04D 25/062 |
| 2025/0154959 A1* | 5/2025 | Tan | .................... | F04D 25/0606 |

* cited by examiner

HANDHELD FAN

TECHNICAL FIELD

The present disclosure relates to the technical field of fans, and in particular to a handheld fan.

BACKGROUND

A handheld fan has good portability and good cooling performance. With improvement of battery technologies, duration performance of the handheld fan is continuously improved. Therefore, the handheld fan is acceptable to more and more consumers in occasions including an outdoor occasion, a travel occasion, and the like. However, when the consumer uses the handheld fan, for example, in a case in which a mobile phone or another electronic device needs to be charged, a portable power source is usually needed, and consequently, inconvenience is caused to the consumer.

SUMMARY

Embodiments of the present disclosure provide a handheld fan, to improve use convenience of a consumer.

A handheld fan includes:
  a housing;
  a fan module disposed in the housing;
  a power module disposed in the housing and configured to supply power to the fan module; and
  a retractable cable module disposed in the housing and including a cable that is retractable relative to the housing to be withdrawn into the housing or extended out of the housing, where the cable is configured to: connect to an external electronic device, and supply power to the external electronic device through the power module.

The handheld fan includes the housing, the fan module, the power module, and the retractable cable module. The fan module is disposed in the housing, the power module is disposed in the housing and is configured to supply power to the fan module, the retractable cable module is disposed in the housing and includes the cable that is retractable relative to the housing to be withdrawn into the housing or extended out of the housing, and the cable is configured to: connect to the external electronic device, and supply power to the external electronic device through the power module. When a user carries the handheld fan and has a charging need, the cable of the retractable cable module is capable of being pulled out of the housing of the handheld fan, and is connected to the external electronic device including a mobile phone and the like. The power module of the handheld fan is configured to: supply power to the external electronic device and achieve a charging function. In this way, a portable power source and a charging wire do not need to be carried, and therefore, use convenience is improved. When the external electronic device is not provided with a rechargeable battery, the user may alternatively supply power to the external electronic device through the power module of the handheld fan. When the user does not need to supply power to the external electronic device again through the handheld fan, the cable of the retractable cable module is capable of be withdrawn into the housing. Therefore, the handheld fan can still have a concise appearance, and is convenient for the user to carry, thereby improving use convenience.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

Figure 1:
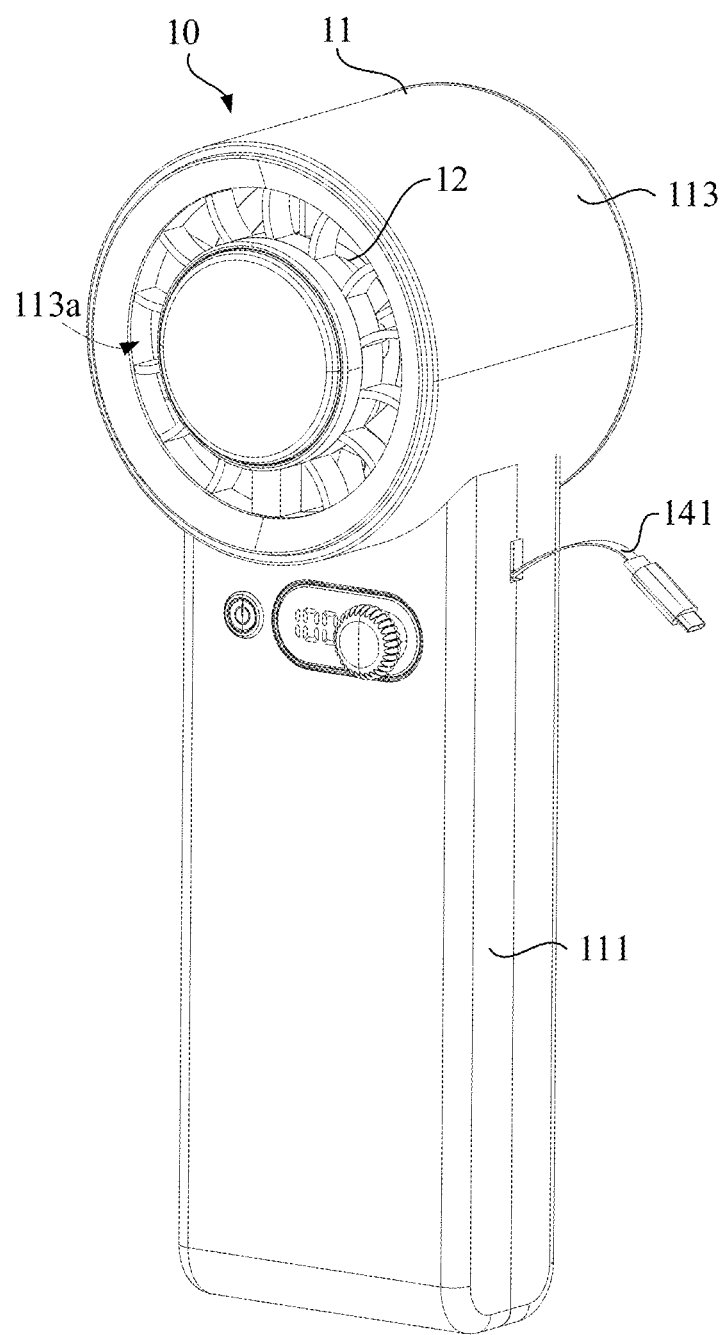
FIG. 1 is a schematic diagram of a handheld fan according to a first embodiment of the present application.

To facilitate the understanding of the present disclosure, the present disclosure is described more completely below with reference to the accompanying drawings. Preferred embodiments of the present disclosure are shown in the drawings. However, the present disclosure may be embodied in various forms without being limited to the embodiments described herein. On the contrary, these embodiments are provided to understand content of the present disclosure more thoroughly and comprehensively.

It should be noted that, when a component is "fixed" to another component, the component may be fixed to the another component directly or via an intermediate component. When a component is "connected" to another component, the component may be connected to the another component directly or via an intermediate component. The terms "vertical", "horizontal", "left", and "right" and similar expressions used herein are for illustrative purposes only.

Unless otherwise defined, all technical and scientific terms used herein have the same meanings as commonly understood by a person skilled in the technical field of the present disclosure. The terms used in the specification of the present disclosure herein are only for the purpose of describing specific embodiments, and are not intended to limit the present disclosure. The term "and/or" used herein includes one or more of the associated items listed.

First Embodiment

Figure 2:
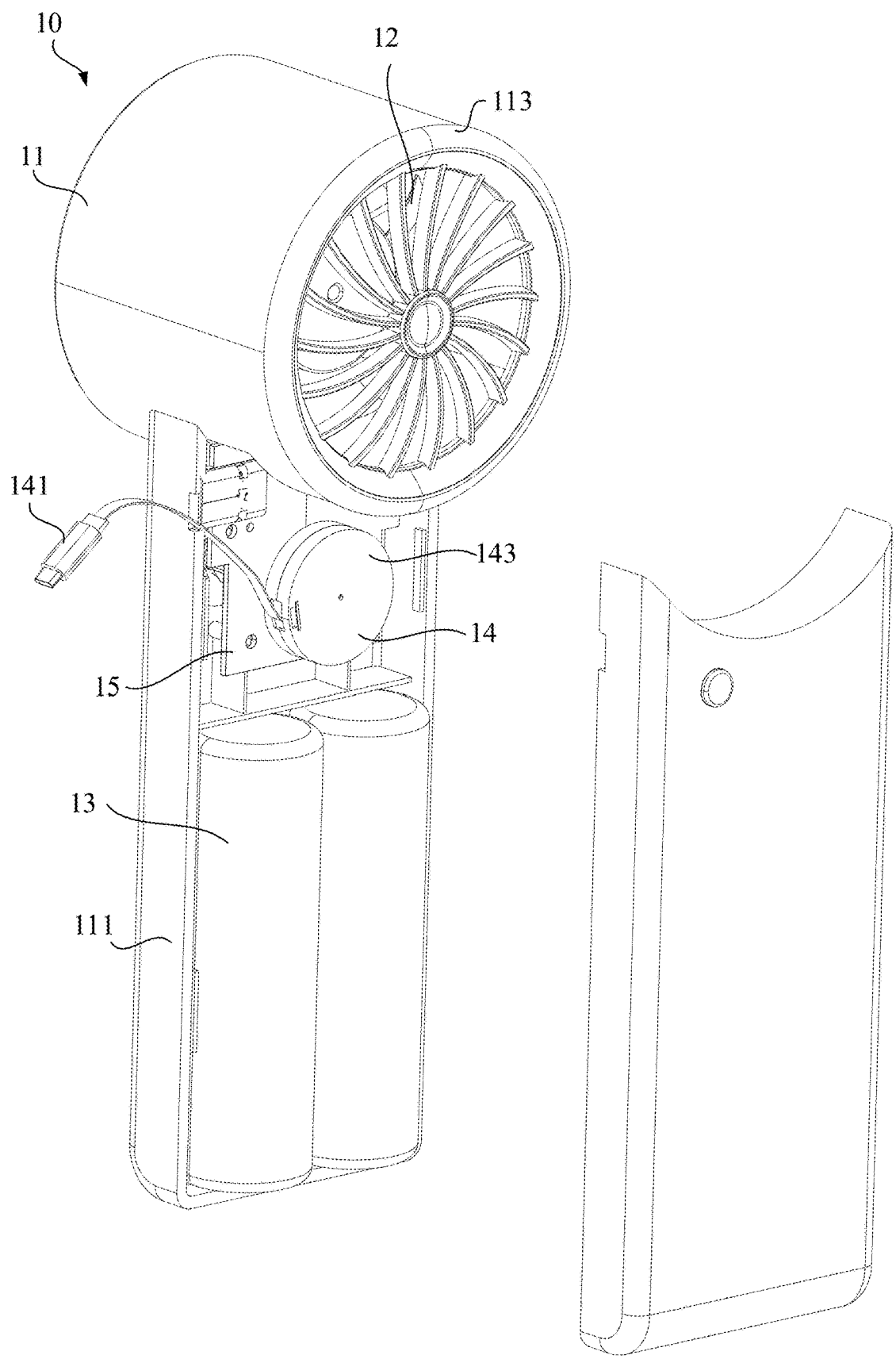
FIG. 2 is an exploded view of the handheld fan shown in FIG. 1.

Refer to FIG. 1 and FIG. 2. The first embodiment of the present disclosure discloses a handheld fan 10, including a fan 11, a fan module 12, a power module 13, and a retractable cable module 14. The fan module 12, the power module 13, and the retractable cable module 14 are separately disposed in the housing 11, and the housing 11 is configured to provide support and limitation for these components. The power module 13 is configured to supply power to the fan module 12. For example, a physical button or a virtual button may be disposed on the housing 11. When the physical button or virtual button is triggered, the fan module 12 and the power module 13 can be powered on or powered off, to start or stop the fan module 12.

The retractable cable module 14 includes a cable 141 that is retractable relative to the housing 11 to be withdrawn into the housing 11 or extended out of the housing 11. The cable 141 is configured to: connect to an external electronic device, and supply power to the external electronic device through the power module 13. In some implementations, the cable 141 is capable of being wrapped up and withdrawn into the housing 11, to achieve hiding effect of the cable 141. Therefore, the handheld fan 10 can keep a concise appearance, and the cable 141 is prevented from causing inconvenience to ordinary use of the user. When the user needs to supply power to the external electronic device including a mobile phone and the like, the cable 141 of the retractable cable module 14 is capable of being pulled out of the housing 11 and is connected to the external electronic device. The power module 13 of the handheld fan 10 is configured to supply power to the external electronic device, for example, charge the mobile phone.

Figure 3:
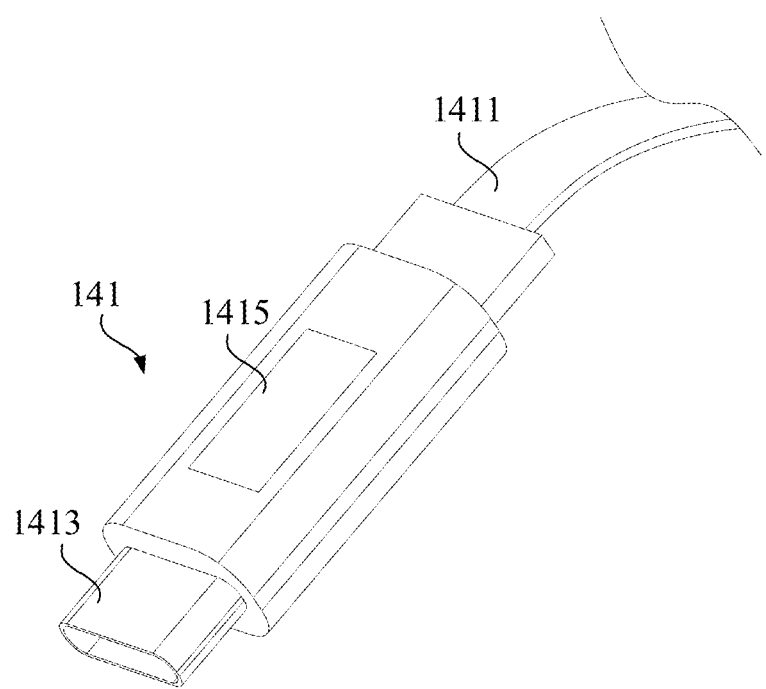
FIG. 3 is a schematic diagram of an embodiment of a cable in the first embodiment.

Refer to FIG. 3. In some implementations, the cable 141 may include a cable body 1411, a connection part 1413, and a digital display part 1415. The digital display part 1415 is connected between a free end of the cable body 1411 and the connection part 1413. The connection part 1413 is configured to connect to the external electronic device. The connection part 1413 may be a Type-C interface, a Micro-USB interface, a Lightning interface, or the like. This is not limited in the present application. The digital display part 1415 may include a display panel, for example, a liquid crystal panel or an organic light-emitting diode (OLED) panel, to display information including a current, a voltage and the like in a working process of the cable 141. Therefore, use convenience is improved. Certainly, the digital display part 1415 is not necessary. For example, in implementations shown in FIG. 1, FIG. 2, and FIG. 4, the cable 141 is not provided with the digital display part 1415.

It may be understood that, the power module 13 of the handheld fan 10 generally includes a battery capable of being repeatedly charged and discharged, for example, a lithium battery. With development of a battery technology, a capacity of the battery has a trend of continuously increasing, and duration performance of the handheld fan 10 is also steadily improved. A large-capacity battery of the handheld fan 10 is combined with the retractable cable module 14. In other words, the power module 13 of the handheld fan 10 is configured to supply power to the external electronic device, for example, charge the mobile phone, thereby improving use convenience.

The handheld fan 10 includes the housing 11, the fan module 12, the power module 13, and the retractable cable module 14. The fan module 12 is disposed in the housing 11, the power module 13 is disposed in the housing 11 and is configured to supply power to the fan module 12, the retractable cable module 14 is disposed in the housing 11 and includes the cable 141 that is retractable relative to the housing 11 to be withdrawn into the housing 11 or extended out of the housing 11, and the cable 141 is configured to: connect to the external electronic device, and supply power to the external power device through the power module 13. When a user carries the handheld fan 10 and has a charging need, the cable 141 of the retractable cable module 14 is capable of being pulled out of the housing 11 of the handheld fan 10, and is connected to the external electronic device including a mobile phone and the like. The power module 13 of the handheld fan 10 is configured to: supply power to the external electronic device and achieve a charging function. Therefore, a portable power source and a charging wire do not need to be carried, and use convenience is improved. When the external electronic device is not provided with a rechargeable battery, the user may alternatively supply power to the external electronic device through the power module 13 of the handheld fan 10. When the user no longer needs to supply power to the external electronic device through the handheld fan 10, the cable 141 of the retractable cable module 14 is capable of being basically withdrawn into the housing 11. Therefore, the handheld fan 10 can still have a concise appearance, and is convenient for the user to carry, thereby improving use convenience.

Refer to FIG. 1. The housing 11 includes a holding part 111 and an air outlet part 113 connected to one end of the holding part 111. The air outlet part 113 protrudes from the holding part 111. In other words, the air outlet part 113 and the holding part 111 are disposed side by side in a length direction of the handheld fan 10. The air outlet part 113 is approximately cylindrical, and is provided with an air outlet part 113a. In a working process of the fan module 12, air flow is capable of being driven to flow out from the air outlet part 113a, to dissipate heat for the user. An air inlet of the housing 11 may have various positions. For example, the air inlet may be located on one side that is of the air outlet part 113 and that is away from the air inlet 113a, or may be located on the holding part 111. This is not limited in the present application. The power module 13 is disposed in the holding part 111. Certainly, the power module 13 may alternatively be disposed in the air outlet part 113. The fan module 12 may be disposed in the air outlet part 113 or the holding part 111. The retractable cable module 14 may also be disposed in the holding part 111 or the air outlet part 113. According to the first embodiment of the present application, an example in which the power module 13 is disposed in the holding part 111, the fan module 12 is disposed in the air outlet part 113, and the retractable cable module 14 is disposed in the holding part 111 is used for description. This should not be considered as limitation to the solution.

Especially, in some implementations, the fan module 12 may be an air compressor, for example, a charging turbine. An appearance design without an impeller of the handheld fan 10 is achieved, that is, a fan without an impeller is achieved, making appearance effect of the handheld fan 10 be more concise.

In the implementation shown in FIG. 1, the holding part 111 and the air outlet part 113 are integrally formed, making an appearance of the handheld fan 10 be concise, and processing and forming be easy. For example, batch manufacturing of the housing 11 can be achieved through injection molding. In another implementation, the air outlet part 113 may alternatively be assembled and fixedly connected with the holding part 113 through clamping, bonding, threaded connection, or the like, to improve assembling convenience.

Figure 4:
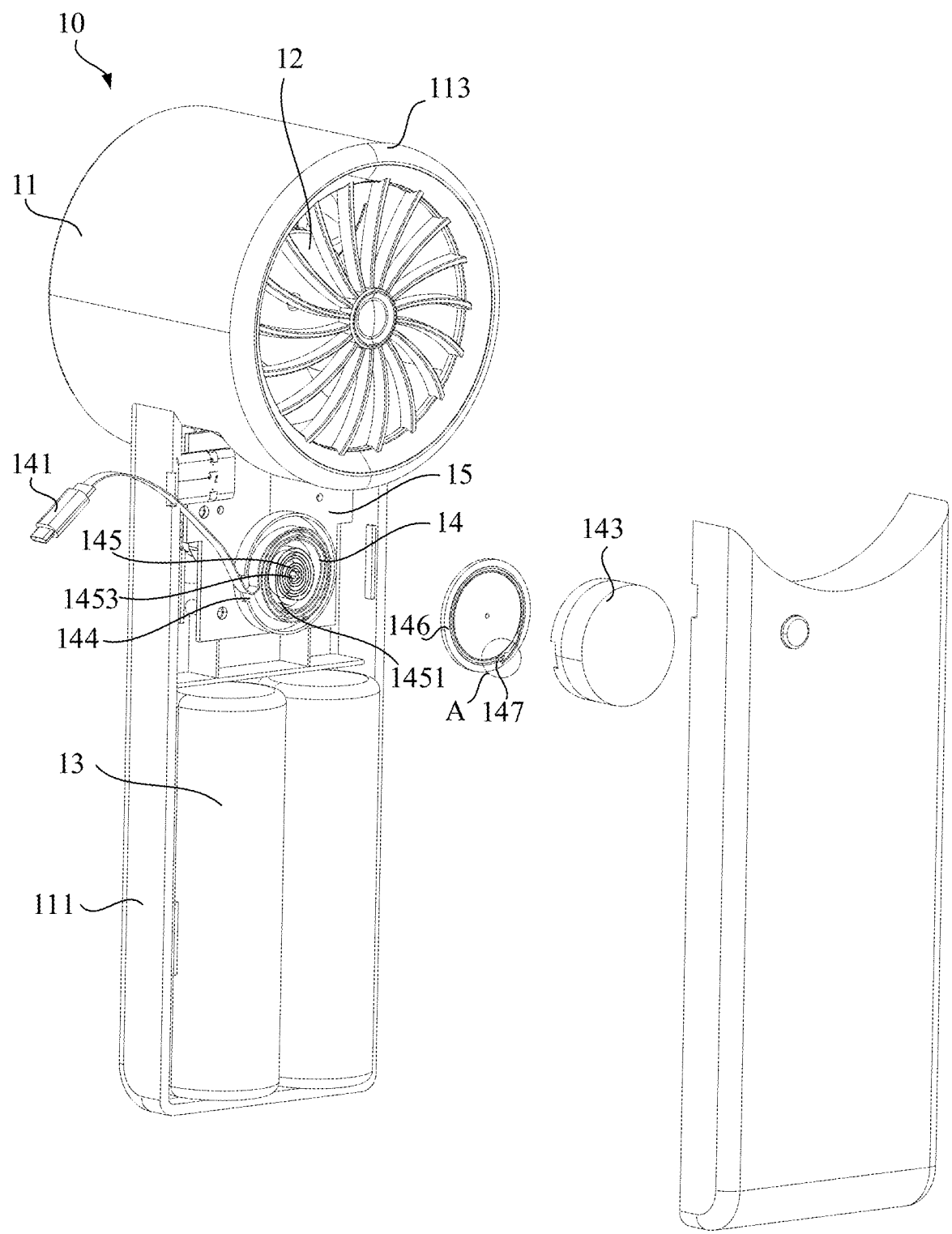
FIG. 4 is another exploded view of the handheld fan shown in FIG. 1.

Refer to FIG. 2 and FIG. 4. The handheld fan 10 includes a first circuit board 15, the first circuit board 15 is disposed in one of the holding part 111 and the air outlet part 113, that is, the first circuit board 15 may be disposed in the holding part 111 or the air outlet part 113. According to the first embodiment of the present application, an example in which the first circuit board 15 is disposed in the holding part 111 is used for description. This should not be considered as limitation to the solution. The first circuit board 15 may be configured to integrate a control circuit, a power management unit, and the like of the handheld fan 10. The power module 13, the fan module 12, and the cable 141 are separately connected to the first circuit board 15 electrically. Components including a start-stop button, a rotation speed rotary knob, and the like of the fan module 12 can be disposed corresponding to the control circuit on the first circuit board 15, to achieve corresponding functions. Details are not described again in the present application.

Refer to FIG. 2 and FIG. 4. The retractable cable module 14 includes a casing 143 disposed in the holding part 111, positions of the casing 143 and the first circuit board 15 are fixed relative to each other, and the cable 141 is disposed in the casing 143 in a retractable manner. The casing 143 may be fixedly connected to the first circuit board 15, or may be fixedly connected to the holding part 111 of the housing 11, to achieve relative fixing between positions of the casing 143 and the first circuit board 15. The retractable cable module 14 including the casing 143 may be manufactured into an independent module, and is assembled into the handheld fan 10, thereby improving assembling efficiency and guaranteeing working reliability of the retractable cable module 14.

Specifically, the retractable cable module 14 may include a second circuit board 144, a torsion spring 145, and a turntable 146 that are disposed in the casing 143, and positions of the second circuit board 144 and the casing 143 are fixed relative to each other, for example, the second circuit board 144 is fixedly connected to the casing 143 or the holding part 111. In addition, the second circuit board 144 is electrically connected to the first circuit board 15, for example, the second circuit board 144 is electrically connected to the first circuit board 15 through lead bonding. The torsion spring 145 may be spiral, and has a first free end 1451 and a second free end 1453. The first free end 1451 of the torsion spring 145 is connected to the turntable 146, and positions of the second free end 1453 and the second circuit board 144 are fixed relative to each other, for example, the second free end 1453 is fixedly connected to the casing 143 or the second circuit board 144. The turntable 146 is rotatably connected to the casing 143. For example, one of the turntable 146 and the casing 143 is provided with a rotating shaft, and the other is provided with a shaft hole, to rotatably connect the turntable 146 to the casing 143. The cable 141 is wound on a periphery of the torsion spring 145, one of the second circuit board 144 and the turntable 146 is provided with a contact pin (not shown in the figure), and the other is provided with an annular conductor (not shown in the figure). The contact pin is in contact and conduction with the annular conductor, and the cable 141 is electrically connected to the contact pin or the annular conductor on the turntable 146, to electrically connect the cable 141 to the second circuit board 144. For example, the second circuit board 144 is provided with a contact pin, the turntable 146 is provided with an annular conductor, and the cable 141 is electrically connected to the annular conductor. Alternatively, the second circuit board 144 is provided with an annular conductor, the turntable 146 is provided with a contact pin, and the cable 141 is electrically connected to the contact pin, to electrically connect the cable 141 to the second circuit board 144. Certainly, the cable 141 may alternatively be electrically connected to the second circuit board 144 directly through lead bonding, or the like.

The cable 141 may be clamped on the turntable 146. In a process of pulling the cable 141 by a user, the turntable 146 is driven to rotate relative to the casing 143 in a direction, for example, a clockwise direction, to gradually extend out of the casing 143. In this process, the contact pin is kept in contact with the annular conductor, to ensure the cable 141 to be electrically connected to the first circuit board 15. In this process, elastic potential energy is stored in the torsion spring 145, making the turntable 146 have a trend of rotating anticlockwise. When the user does not need to supply power to an external electronic device through the handheld fan 10 again, the elastic potential energy can be released by the torsion spring 145, and the cable 141 extending out of the casing 143 is driven to gradually roll into the casing 143.

Figure 5:
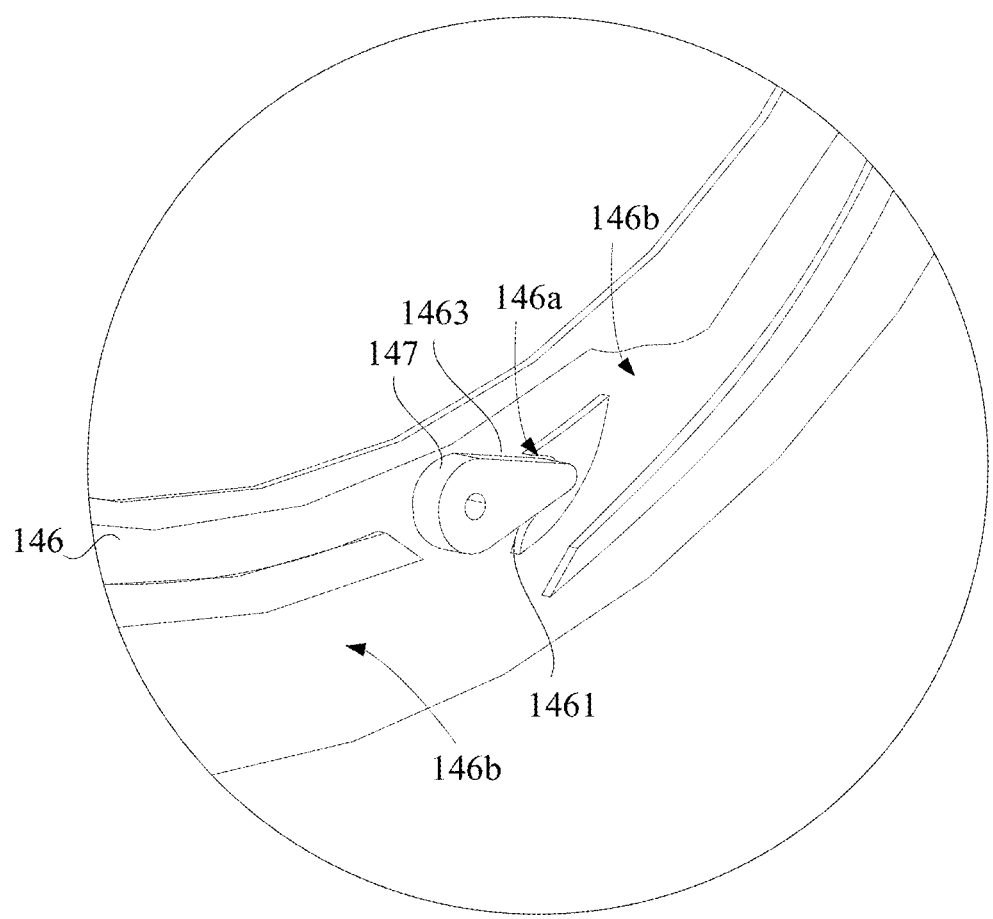
FIG. 5 is a schematic enlarged view of a part A of the handheld fan shown in FIG. 4.

Refer to FIG. 5. In some implementations, the retractable cable module 14 includes a clamping block 147 rotatably connected to the casing 143. The turntable 146 has a stopping position 1461 and an unlocking position 1463. In a process of pulling the cable 141 out of the casing 143, when the turntable 146 is driven by the cable 141 to rotate to the stopping position 1461 for corresponding to the clamping block 147, rotation of the turntable 146 is limited through the clamping block 147. When the cable 141 is continuously pulled out of the casing 143 and is configured to drive the turntable 146 to rotate, the clamping block 147 is rotated relative to the casing 143 and moved to the unlocking position 1463, to gradually wrap up the cable 141 into the casing 143. FIG. 5 shows a limiting slot 146a and a guide slot 146b that are correspondingly disposed on the turntable 146. A slot wall of the limiting slot 146a may be used as the stopping position 1461, and a joint between the slot wall of the guide slot 146b and a slot wall of the limiting slot 146a is the unlocking position 1463.

The side wall of the guide slot 146b may be configured to: guide and limit motion of a tail end of the clamping block 147. In a process of pulling out the cable 141, the tail end of the clamping block 147 is continuously moved along the guide slot 146b. When the user no longer pulls the cable 141 to extend out, the turntable 146 is driven by the torsion spring 145 to rotate reversely (for example, clockwise), and the tail end of the clamping block 147 is guided by the side wall of the guide slot 146b to enter the limiting slot 146a, achieving stopping of the cable 141. When the user continuously pulls the cable 141 to extend out, the turntable 146 is continuously rotated in the original direction (for example, anticlockwise), the tail end of the clamping block 147 is withdrawn from the limiting slot 146a and enters the guide slot 146b, and therefore, the cable 141 can be continuously stretched outward. It may be understood that, depths and widths of the guide slot 146b and the limiting slot 146a can be designed to achieve the foregoing functions. Details are not described in the present application again.

When the user pulls the cable 141 to extend out of the casing 143 to drive the turntable 146 to rotate, a clamping point at the tail end of the clamping block 147 is moved along the guide slot 146b to the stopping position 1461. In this case, if the user no longer pulls the cable 141 continuously, under action of the torsion spring 145, the clamping point at the tail end of the clamping block 147 abuts against the slot wall of the limiting slot 146a, and the turntable 146 is no longer continuously rotated, in other words, stopping effect of the cable 141 can be achieved. When the user continuously pulls the cable 141 out of the casing 143 to drive the turntable 146 to rotate, the clamping block 147 is rotated relative to the casing 143 and is withdrawn into the guide slot 146*b*, and can be switched to the guide slot 146*b* to continuously move along the guide slot 146*b*, that is, to reach the unlocking position 1463. The turntable 146 can be continuously rotated, and the cable 141 is continuously extended out of the casing 143, or the cable 141 can be gradually wrapped up into the casing 143. Effect of stopping and automatic wrap-up for the cable 141 can be achieved through fitting between the clamping block 147 and the turntable 146, thereby improving use convenience. In addition, the turntable 146 may be provided with two or more stopping positions 1461 and unlocking positions 1463. The stopping positions 1461 may be in a one-to-one correspondence with the unlocking positions 1463.

Certainly, in some other implementations, the clamping block 147 may be replaced with another structure to achieve stopping effect on the cable 141. For example, the handheld fan 10 may include a limiting member (not shown in the figure) that movably fits the holding part 111 or the first circuit board 15, the limiting member has a first position and a second position, and the cable 141 is capable of being pulled out of or withdrawn into the holding part 111 at the first position; and at the second position, the limiting member abuts against the cable 141 and is configured to limit movement of the cable 141 relative to the holding part 111.

For example, the limiting member slidably fits the holding part 111, and sliding between the limiting member and the holding part 111 has proper damping, preventing the limiting member from being easily drawn back. In a process of pulling out the cable 141 by the user, when the cable 141 needs to be stopped, the limiting member is pushed to slide relative to the holding part 111 to a position abutting against the cable 141, namely the second position, achieving stopping of the cable 141 on the holding part 111. When the user needs to withdraw the cable 141 into the holding part 111, the limiting member is pushed to the first position in a reverse direction. After the limiting member no longer achieves abutting effect for the cable 141, the cable 141 is capable of being wrapped up into the casing 143 under action of the torsion spring 145 and the turntable 146.

For example, the limiting member rotatably fits the holding part 111, and the limiting member has an eccentric wheel structure and proper damping, preventing the limiting member from being easily drawn back. In a process of pulling out the cable 141 by the user, when the cable 141 needs to be stopped, the limiting member is rotated to the second position, making the eccentric wheel of the limiting member abut against the cable 141, to achieve stopping of the cable 141 on the holding part 111. When the user needs to withdraw the cable 141 into the holding part 111, the limiting member is rotated to the first position in a reverse direction. After the eccentric wheel of the limiting member no longer achieves abutting effect for the cable 141, the cable 141 can be wrapped up into the casing 143 under action of the torsion spring 145 and the turntable 146.

Effect of stopping the cable 141 can be achieved through the two limiting member structures, and automatic wrap-up effect can be achieved in combination with the torsion spring 145, improving user convenience. In another implementation, the limiting member may alternatively be of another structural form, to achieve stopping effect for the cable 141.

It may be understood that the casing 143 of the retractable cable module 14 is not necessary, and may be omitted to simplify the structure of the handheld fan 10 and improve structural compactness of the handheld fan 10. For example, the retractable cable module 14 includes the torsion spring 145 and the turntable 146 that is rotatably connected to one of the holding part 111 and the first circuit board 15. A first free end 1451 of the torsion spring 145 is connected to the turntable 146, and positions of a second free end 1453 of the torsion spring 145 and the first circuit board 15 are fixed relative to each other. The cable 141 is wound on a periphery of the torsion spring 145 and is electrically connected to the first circuit board 15 directly, or the cable 141 is electrically connected to the first circuit board 15 through a contact pin and an annular conductor. The cable 141 may be clamped on the turntable 146. In a process of pulling the cable 141 by a user, the turntable 146 is driven to rotate relative to the holding part 111 in a direction, for example, a clockwise direction, to gradually extend out of the holding part 111. In this process, elastic potential energy is stored in the torsion spring 145, making the turntable 146 have a trend of rotating clockwise. When the user no longer needs to supply power to an external electronic device through the handheld fan 10, the elastic potential energy can be released by the torsion spring 145, and the cable 141 extending out of the holding part 111 is driven to gradually roll into the holding part 111.

In this implementation, the retractable cable module 14 may include a clamping block 147 rotatably connected to one of the holding part 111 and the first circuit board 15. The turntable 146 has a stopping position 1461 and an unlocking position 1463. In a process of pulling the cable 141 out of the holding part 111, when the turntable 146 is driven by the cable 141 to rotate to the stopping position 1461 for corresponding to the clamping block 147, rotation of the turntable 146 is limited through the clamping block 147. When the cable 141 is continuously pulled out of the holding part 111 and is configured to drive the turntable 146 to rotate, the clamping block 147 is moved relative to the turntable 146 to the unlocking position 1463, to gradually wrap up the cable 141 into the holding part 111. For a stopping principle, a structure, and an unlocking principle of the clamping block 147 for the cable 141, refer to the foregoing content. Details are not described herein again. Effect of stopping the cable 141 can be achieved through fitting between the clamping block 147 and the turntable 146, and automatic wrap-up effect can be achieved in combination with the torsion spring 145, thereby improving use convenience.

Certainly, in this implementation, the handheld fan 10 may also include a limiting member that movably fits one of the holding part 111 and the first circuit board 15, the limiting member has a first position and a second position, and the cable 141 is capable of being pulled out of or withdrawn into the holding part 111 at the first position; and at the second position, the limiting member abuts against the cable 141 and is configured to limit movement of the cable 141 relative to the holding part 111. For a stopping principle, a structure, and an unlocking principle of the limiting member for the cable 141, refer to the foregoing content. Details are not described herein again. The cable 141 can be stopped through the limiting member structure, and automatic wrap-up effect can be achieved in combination with the torsion spring 145, improving user convenience. In another implementation, the limiting member may alternatively be of another structural form, to achieve stopping effect for the cable 141.

Second Embodiment

Figure 6:
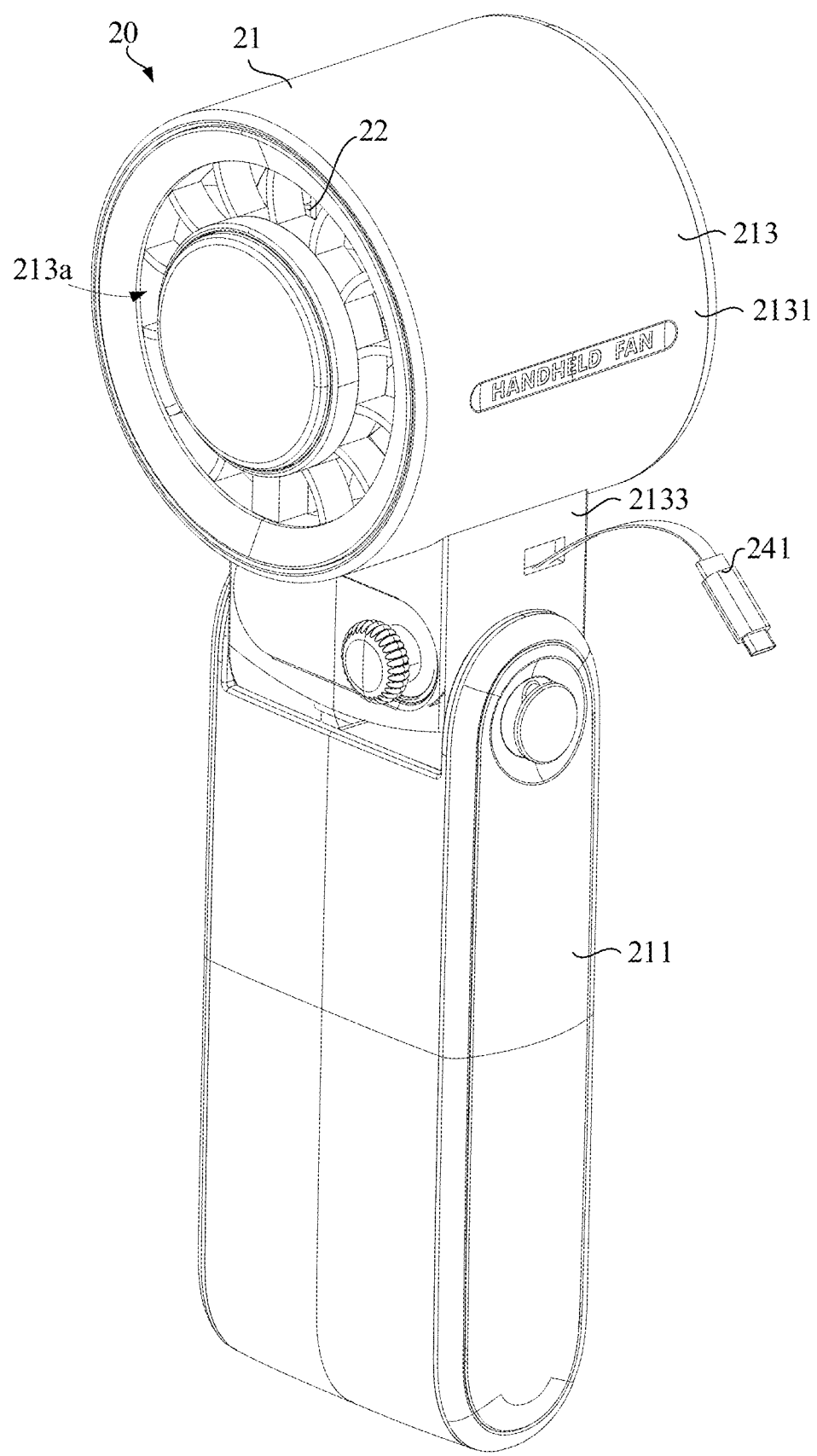
FIG. 6 is a schematic diagram of a handheld fan according to a second embodiment of the present application.
Figure 7:
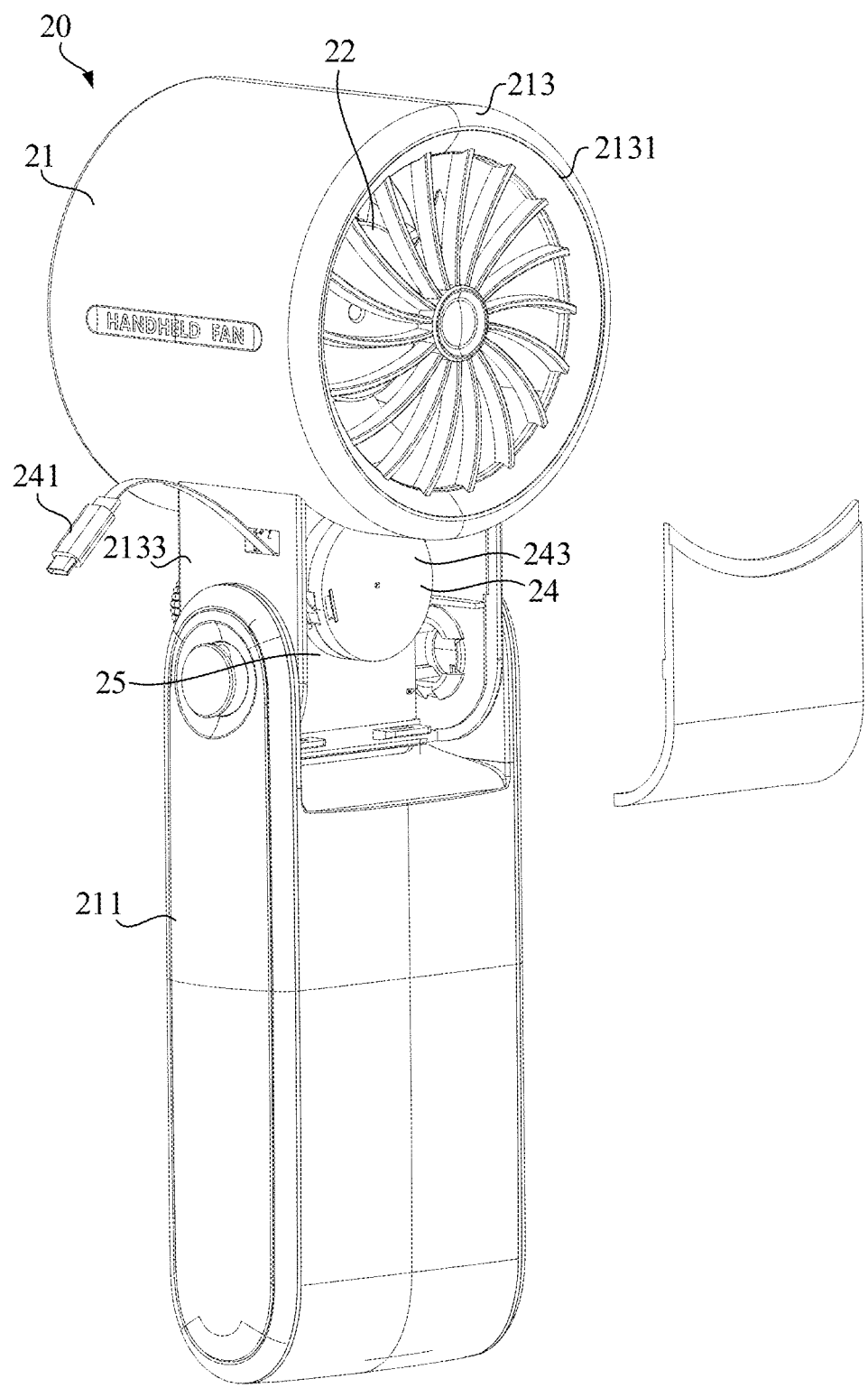
FIG. 7 is an exploded view of the handheld fan shown in FIG. 6.
Figure 8:
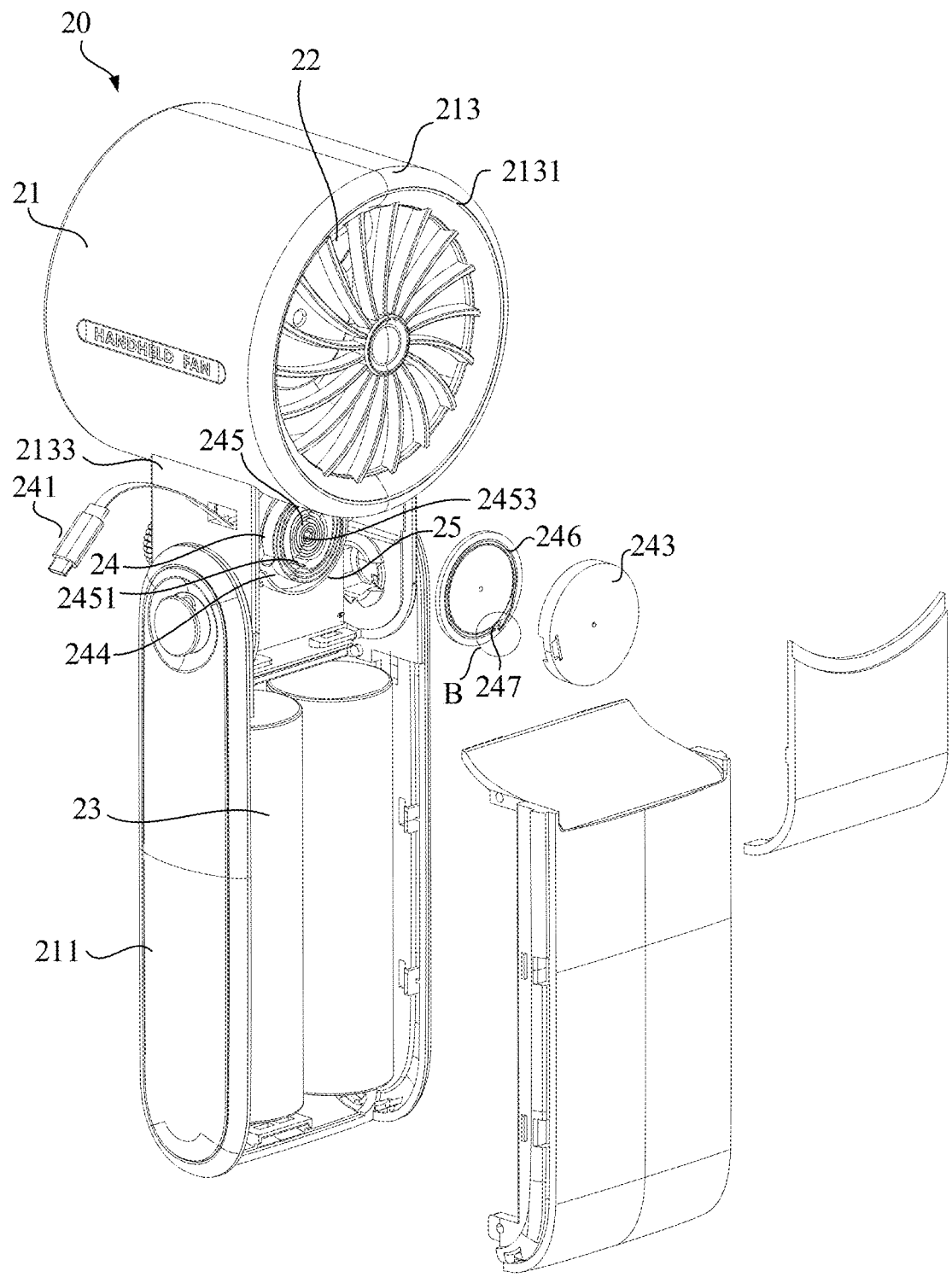
FIG. 8 is another exploded view of the handheld fan shown in FIG. 6.

Refer to FIG. 6, FIG. 7, and FIG. 8. The second embodiment of the present disclosure discloses a handheld fan 20, including a fan 21, a fan module 22, a power module 23, and a retractable cable module 24. The fan module 22, the power module 23, and the retractable cable module 24 are separately disposed in the housing 21, and the housing 21 is configured to provide support and limitation for these components. The power module 23 is configured to supply power to the fan module 22. The retractable cable module 24 includes a cable 241 that is retractable relative to the housing 21 to be withdrawn into the housing 21 or extended out of the housing 21, where the cable 241 is configured to: connect to an external electronic device, and supply power to the external electronic device through the power module 23.

Refer to FIG. 6. The housing 21 includes a holding part 211 and an air outlet part 213 connected to one end of the holding part 211. The air outlet part 213 protrudes from the holding part 211. In other words, the air outlet part 213 and the holding part 211 are disposed side by side in a length direction of the handheld fan 10. The air outlet part 213 is provided with an air outlet 213a. In a working process of the fan module 22, air flow can be driven to flow out from the air outlet 213a, to dissipate heat for a user. An air inlet of the housing 21 may have various positions. For example, the air inlet may be located on the air outlet part 213, or may be located on the holding part 211. This is not limited in the present application. The power module 23 is disposed in the holding part 211 or the air outlet part 213. The fan module 22 may be disposed in the air outlet part 213 or the holding part 211. The retractable cable module 24 may also be disposed in the holding part 211 or the air outlet part 213. According to the second embodiment of the present application, an example in which the power module 23 is disposed in the holding part 211, and the fan module 22 and the retractable cable module 24 are separately disposed in the air outlet part 213 is used for description. This should not be considered as limitation to the solution.

Different from that in the first embodiment, in the second embodiment of the present application, the holding part 211 of the handheld fan 20 is rotatably connected to the air outlet part 213. In other words, the air outlet part 213 is capable of rotating relative to the holding part 211, to change an included angle between the air outlet part 213 and the holding part 211, that is, to adjust an air outlet angle, facilitating use of the user. Especially, in some implementations, the air outlet part 213 is rotatably connected to the holding part 211, making the air outlet part 213 be folded and closed in the holding part 211 to reduce an integral size of the handheld fan 20 when the handheld fan 20 is not used, thereby further improving convenience.

Refer to FIG. 7 and FIG. 8, in some implementations, the handheld fan 20 includes a first circuit board 25. The first circuit board 25 is disposed in one of the air outlet part 213 and the holding part 211. The power module 23, the fan module 22, and the cable 241 are electrically connected to the first circuit board 25 separately. An example in which the first circuit board 25 is disposed in the air outlet part 213 is used for description in the present application. In another implementation, the first circuit board 25 may be disposed in the holding part 211. Details are not described herein again.

In the second embodiment of the present application, the cable 241 of the retractable cable module 24 is capable of being wrapped up and withdrawn into the air outlet part 213, to achieve hiding effect of the cable 241. Therefore, the handheld fan 20 can keep a concise appearance, and the cable 241 is prevented from causing inconvenience to ordinary use of the user. When the user needs to supply power to an external electronic device including a mobile phone and the like, the cable 241 of the retractable cable module 24 is capable of being pulled out of the air outlet part 213 and is connected to the external electronic device. The power module 23 of the handheld fan 20 is configured to supply power to the external electronic device, for example, charge the mobile phone.

Figure 9:
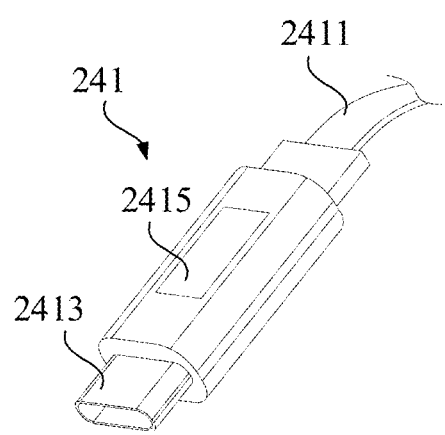
FIG. 9 is a schematic diagram of an embodiment of a cable in the second embodiment.

Refer to FIG. 9. In some implementations, the cable 241 may include a cable body 2411, a connection part 2413, and a digital display part 2415. The digital display part 2415 is connected between a free end of the cable body 2411 and the connection part 2413. The connection part 2413 is configured to connect to the external electronic device. The connection part 2413 may be a Type-C interface, a Micro-USB interface, a Lightning interface, or the like. This is not limited in the present application. The digital display part 2415 may include a display panel, for example, a liquid crystal panel or an organic light-emitting diode (OLED) panel, to display information including a current, a voltage and the like in a working process of the cable 241. Therefore, use convenience is improved. Certainly, the digital display part 2415 is not necessary, and may be omitted.

It may be understood that, the power module 23 of the handheld fan 20 generally includes a battery capable of being repeatedly charged and discharged, for example, a lithium battery. With development of a battery technology, a capacity of the battery has a trend of continuously increasing, and duration performance of the handheld fan 20 is also steadily improved. A large-capacity battery of the handheld fan 20 is combined with the retractable cable module 24. In other words, the power module 23 of the handheld fan 20 is configured to supply power to the external electronic device, for example, charge the mobile phone, thereby improving use convenience.

The handheld fan 20 includes the housing 21, the fan module 22, the power module 23, and the retractable cable module 24. The fan module 22 is disposed in the air outlet part 213 of the housing 21, the power module 23 is disposed in the holding part 211 of the housing 21 and is configured to supply power to the fan module 22, the retractable cable module 24 is disposed in the air outlet part 213 and includes the cable 241 that is retractable relative to the air outlet part 213 to be withdrawn into the air outlet part 213 or extended out of the air outlet part 213, and the cable 241 is configured to: connect to the external electronic device, and supply power to the external power device through the power module 23. When a user carries the handheld fan 20 and has a charging need, the cable 241 of the retractable cable module 24 is capable of being pulled out of the handheld fan 20, and is connected to the external electronic device including a mobile phone and the like. The power module 23 of the handheld fan 20 is configured to: supply power to the external electronic device, for example, achieve a charging function. Therefore, a portable power source and a charging wire do not need to be carried, and use convenience is improved. When the external electronic device is not provided with a rechargeable battery, the user may alternatively supply power to the external electronic device through the power module 23 of the handheld fan 20. When the user no longer needs to supply power to the external electronic device through the handheld fan 20, the cable 241 of the retractable cable module 24 is capable of being basically withdrawn into the air outlet part 213. In addition, the user can fold and close the air outlet part 213 into the holding part 211, reducing an integral size of the handheld fan 20, and keeping a concise appearance. The handheld fan 20 is convenient for the user to carry, thereby improving use convenience.

Specifically, still refer to FIG. 7 and FIG. 8. In some implementations, the air outlet part 213 may include a fan cover 2131 and a mounting part 2133 connected to the fan cover 2131. The fan cover 2131 is approximately cylindrical and is provided with an air outlet 213a. The mounting part 2133 is approximately in a shape of a hollow rectangular box, and is rotatably connected to the holding part 211. The first circuit board 25 and the retractable cable module 24 are disposed in the mounting part 2133. In another implementation, the first circuit board 25 and the retractable cable module 24 may be disposed in the holding part 211, to reduce a size of the mounting part 2133. For the implementation, refer to the first embodiment. Details are not described herein again.

Similar to the first embodiment, the retractable cable module 24 may include a casing 243 disposed in the mounting part 2133, positions of the casing 243 and the first circuit board 25 are fixed relative to each other, and the cable 241 is disposed in the casing 243 in a retractable manner. The casing 243 may be fixedly connected to the first circuit board 25, or may be fixedly connected to the mounting part 2133, to achieve relative fixing between positions of the casing 243 and the first circuit board 25. The retractable cable module 24 including the casing 243 may be manufactured into an independent module, and is assembled into the handheld fan 20, thereby improving assembling efficiency and guaranteeing working reliability of the retractable cable module 24.

Specifically, the retractable cable module 24 may include a second circuit board 244, a torsion spring 245, and a turntable 246 that are disposed in the casing 243, and positions of the second circuit board 244 and the casing 243 are fixed relative to each other, and the second circuit board 244 is electrically connected to the first circuit board 25. For example, the second circuit board 244 is electrically connected to the first circuit board 25 through lead bonding. A first free end 2451 of the torsion spring 245 is connected to the turntable 246, a second free end 2453 of the torsion spring 245 is connected to the casing 243, the turntable 246 is rotatably connected to the casing 243, and the cable 241 is wound on a periphery of the torsion spring 245. One of the second circuit board 244 and the turntable 246 is provided with a contact pin (not shown in the figure), and the other is provided with an annular conductor (not shown in the figure). The contact pin is in contact and conduction with the annular conductor, and the cable 241 is electrically connected to the contact pin or the annular conductor on the turntable 246. The cable 241 is configured to pull the turntable 246 to rotate relative to the casing 243 to gradually extend out of the casing 243. The turntable 246 is configured to drive the cable 241 extending out of the casing 243 to gradually roll into the casing 243. For a structure and a principle of the retractable cable module 24 and fitting between the retractable cable module 24 and the mounting part 2133 of the housing 21, refer to the first embodiment. Details are not described herein again. Certainly, the cable 241 may alternatively be electrically connected to the second circuit board 244 directly through lead bonding, or the like.

Figure 10:
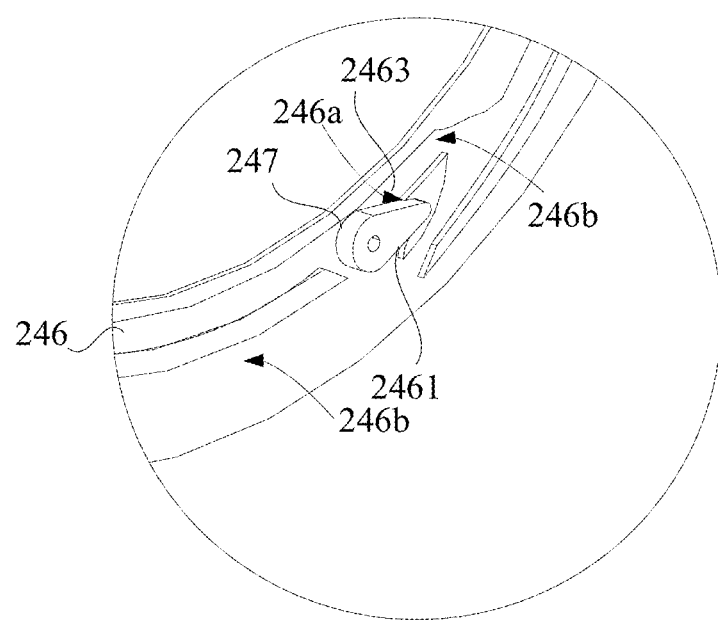
FIG. 10 is an enlarged view of a part B of the handheld fan shown in FIG. 6.

Certainly, with reference to FIG. 10, the retractable cable module 24 may include a clamping block 247 rotatably connected to the casing 243, the turntable 246 has a stopping position 2461 and an unlocking position 2463, in a process of pulling the cable 241 out of the casing 243, rotation of the turntable 246 is limited by the clamping block 247 when the turntable 246 is driven by the cable 241 to rotate to the stopping position 2461 for corresponding to the clamping block 247. When the cable 241 is continuously pulled out of the casing 243 and is configured to drive the turntable 246 to rotate, the clamping block 247 is rotated relative to the casing 243 and is moved to the unlocking position 2463, making the cable 241 be gradually wrapped up into the casing 243. For a structure and a principle of stopping and unlocking the cable 241 through fitting between the clamping block 247 and the turntable 246, refer to the first embodiment. For example, a limiting slot 246a and a guide slot 246b are correspondingly disposed on the turntable 246. A slot wall of the limiting slot 246a may be used as the stopping position 2461, and a joint between the slot wall of the guide slot 246b and a slot wall of the limiting slot 246a is the unlocking position 2463. Details are not described herein again.

Certainly, in some other implementations, the clamping block 247 may be replaced with another structure to achieve stopping effect on the cable 241. For example, the handheld fan 20 may include a limiting member (not shown in the figure) that movably fits the mounting part 2133 or the first circuit board 25, the limiting member has a first position and a second position, and the cable 241 is capable of being pulled out of or withdrawn into the mounting part 2133 at the first position; and at the second position, the limiting member abuts against the cable 241 and is configured to limit movement of the cable 241 relative to the mounting part 2133.

For example, the limiting member slidably fits the mounting part 2133, and sliding between the limiting member and the mounting part 2133 has proper damping, preventing the limiting member from being easily drawn back. In a process of pulling out the cable 241 by the user, when the cable 241 needs to be stopped, the limiting member is pushed to slide relative to the mounting part 2133 to a position abutting against the cable 241, namely the second position, achieving stopping of the cable 241 on the mounting part 2133. When the user needs to withdraw the cable 241 into the mounting part 2133, the limiting member is pushed to the first position in a reverse direction. After the limiting member no longer achieves abutting effect for the cable 241, the cable 241 can be wrapped up into the mounting part 2133 under action of the torsion spring 245 and the turntable 246.

For example, the limiting member rotatably fits the mounting part 2133, and the limiting member has an eccentric wheel structure and proper damping, preventing the limiting member from being easily drawn back. In a process of pulling out the cable 241 by the user, when the cable 241 needs to be stopped, the limiting member is rotated to the second position, making the eccentric wheel of the limiting member abut against the cable 241, to achieve stopping of the cable 241 on the mounting part 2133. When the user needs to withdraw the cable 241 into the mounting part 2133, the limiting member is rotated to the first position in a reverse direction. After the eccentric wheel of the limiting member no longer achieves abutting effect for the cable 241, the cable 241 can be wrapped up into the mounting part 2133 under action of the torsion spring 245 and the turntable 246.

Effect of stopping and automatic wrap-up for the cable 241 can be achieved through the two limiting member structures, thereby improving user convenience. In another implementation, the limiting member may alternatively be of another structural form, to achieve stopping effect for the cable 241.

Similar to the first embodiment, the casing 243 of the retractable cable module 24 may alternatively be omitted to improve structural compactness of the handheld fan 20. For example, the retractable cable module 24 includes the torsion spring 245 and the turntable 246 rotatably connected to one of the mounting part 2133 and the first circuit board 25, to achieve retractable motion of the cable 241 relative to the mounting part 2133. Specifically, the first free end 2451 of the torsion spring 245 may be connected to the turntable 246, positions of the second free end 2453 of the torsion spring 245 and the first circuit board 25 are fixed relative to each other, the cable 241 is wound on a periphery of the torsion spring 245, the cable 241 is configured to pull the turntable 246 to rotate relative to the first circuit board 25 to gradually extend out of the mounting part 2133, and the turntable 246 is configured to drive the cable 241 that is extended out of the mounting part 2133 to gradually roll into the mounting part 2133. When the casing 243 is omitted, for structural fitting and a working principle of the torsion spring 245, the turntable 246, the mounting part 2133, and the first circuit board 25, refer to the first embodiment. Details are not described herein again.

In this implementation, the retractable cable module 24 may include a clamping block 247 rotatably connected to one of the mounting part 2133 and the first circuit board 25. The turntable 246 has a stopping position 2461 and an unlocking position 2463. In a process of pulling the cable 241 out of the mounting part 2133, when the turntable 246 is driven by the cable 241 to rotate to the stopping position 2461 for corresponding to the clamping block 247, rotation of the turntable 246 is limited through the clamping block 247. When the cable 241 is continuously pulled out of the mounting part 2133 and is configured to drive the turntable 246 to rotate, the clamping block 247 is moved relative to the turntable 246 to the unlocking position 2463, to gradually wrap up the cable 241 into the mounting part 2133. For a structure and a principle for stopping and unlocking of the cable 241 through fitting between the clamping block 247 and the turntable 246, refer to the first embodiment. Details are not described herein again.

Certainly, in this implementation, the handheld fan 20 may include a limiting member that movably fits the mounting part 2133 or the first circuit board 25, the limiting member has a first position and a second position, and the cable 241 is capable of being pulled out of or withdrawn into the mounting part 2133 at the first position; and at the second position, the limiting member abuts against the cable 241 and is configured to limit movement of the cable 241 relative to the mounting part 2133. The limiting member and the mounting part 2133 may adopt a slidable fitting structure, or a rotatable fitting structure. For details, refer to the description in the first embodiment. Details are not described herein again. Certainly, the structure for stopping and unlocking the cable 241 on the mounting part 2133 may also have another form, to achieve stopping of the pulled-out cable 241. When the user does not require stopping the cable 241, the cable 241 may be conveniently withdrawn into the mounting part 2133. Details are not described herein again.

Figure 11:
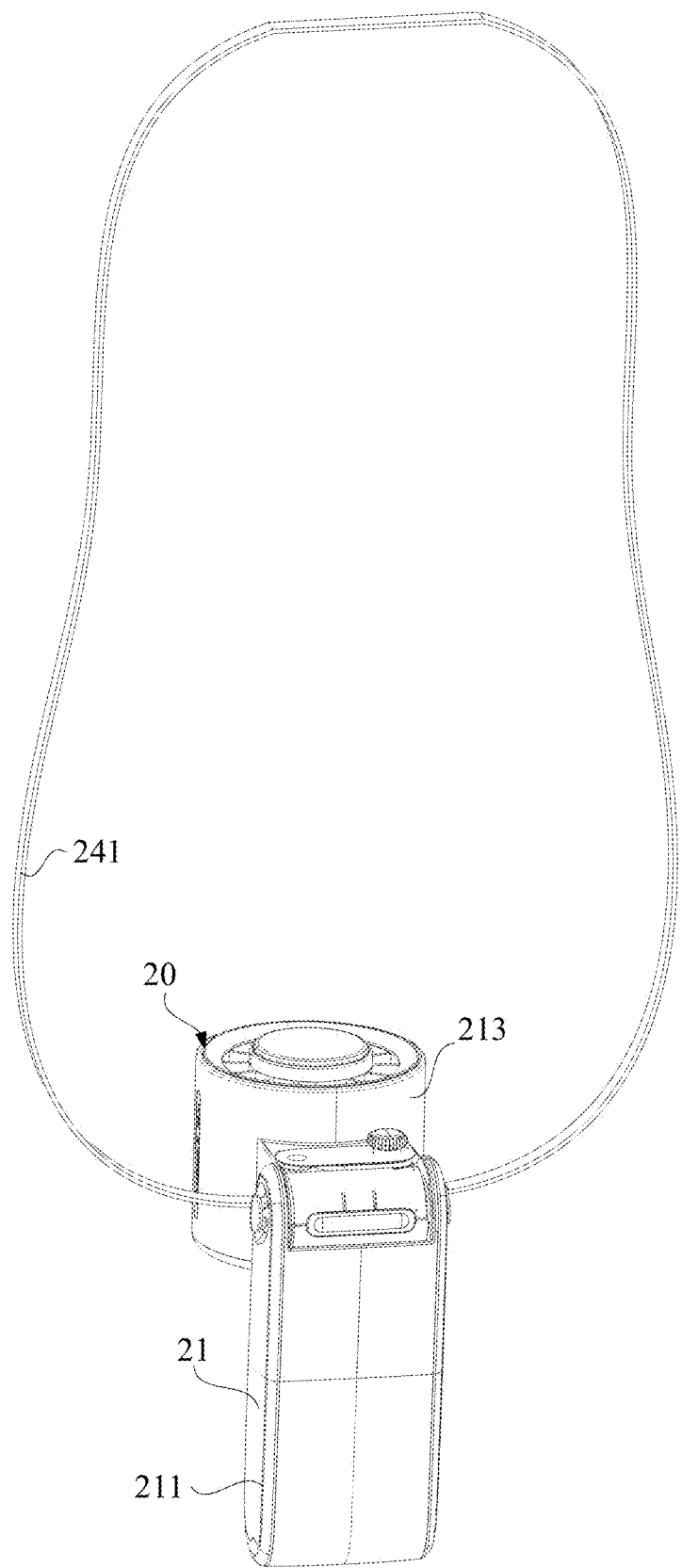
FIG. 11 is a schematic diagram of a first implementation of the handheld fan in the second embodiment.

Refer to FIG. 11. In some implementations, at least one of the air outlet part 213 and the holding part 211 is provided with a clamping structure (not shown in the figure), the clamping structure is configured to clamp with one end that is of the cable 241 and that is extended out of the housing 21, namely, the free end of the cable 241, to form an annular structure suspended to a human body. For example, the air outlet part 213 may be provided with a clamping slot (not shown in the figure), and a clamping plate (not shown in the figure) that slidably fits the air outlet part 213. After the user pulls out of the cable 241 that is withdrawn into the housing 21, the free end of the cable 241 is capable of extending into the clamping slot, and then the clamping plate is pushed to cover the clamping slot to clamp the cable 241 to the air outlet part 213. Therefore, the cable 241 forms an annular structure suspended to a human body. The user suspends the handheld fan 20 on the neck through the annular structure, or a hand of the user gets through the annular structure. After the air outlet part 213 rotates to a specific angle, for example, 85 degrees relative to the holding part 211, the user can suspend the handheld fan 20 on the neck through the annular structure. In this case, the air outlet part 213 can still be configured to blow air to the face, and the hands of the user can be free to do other rings. Therefore, use convenience of the handheld fan 20 is improved, and a usage scenario of the handheld fan 20 is expanded. After the clamping plate is drawn back by the user, the free end of the cable 241 can be unlocked from the housing 21, so as to be normally wrapped up into the housing 21. The clamping structure may have another form. For example, the air outlet part 213 or the holding part 211 is provided with a hasp capable of being opened and closed. After the hasp is opened, the free end of the cable 241 is capable of being placed in. After the hasp is closed, the free end of the cable 241 is capable of being clamped on the housing 21, to form an annular structure suspended to the human body.

Certainly, in the first embodiment of the present application, a clamping structure may alternatively be disposed on the housing 21 to fix the free end of the cable 241 to the housing 21, to form an annular structure suspended to the human body, thereby facilitating carrying of the handheld fan 20. Details are not described herein again.

Figure 12:
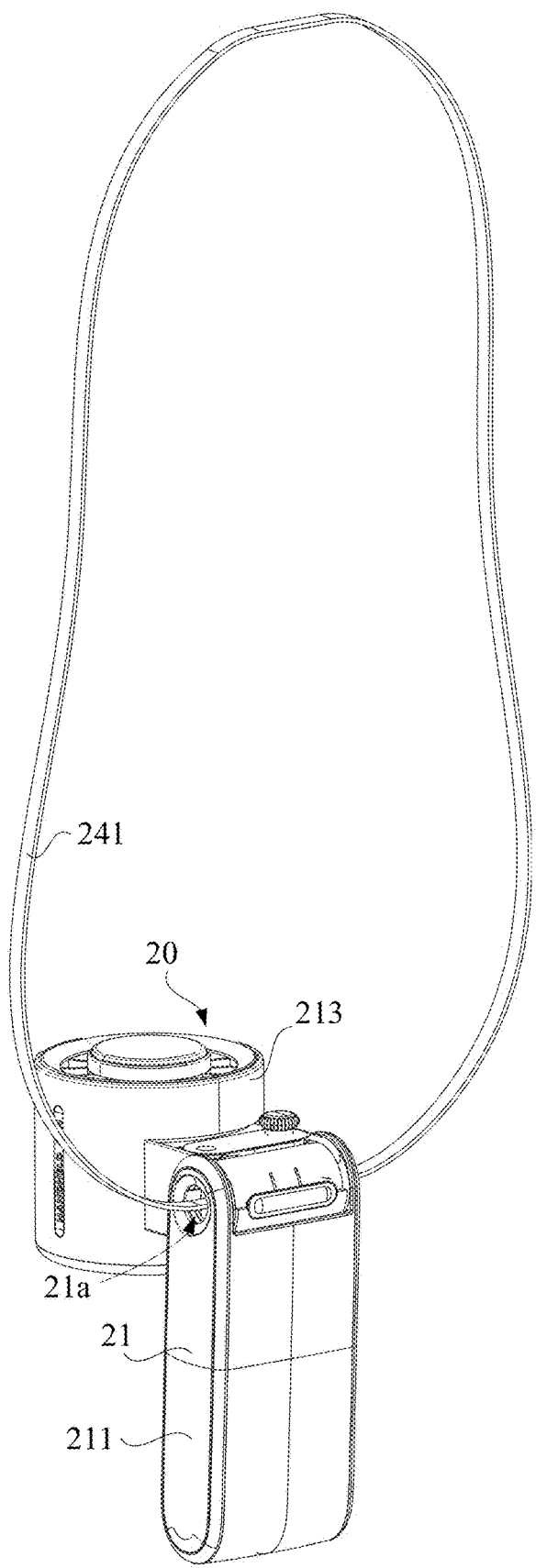
FIG. 12 is a schematic diagram of a second implementation of the handheld fan in the second embodiment.

Further, refer to FIG. 12. In some implementations, at least one of the air outlet part 213 and the holding part 211 is provided with a shaft hole 21*a*, and an axis of rotation of the air outlet part 213 relative to the holding part 211 passes through the shaft hole 21*a*. The cable 241 is configured to extend out from one end of the shaft hole 21*a*, and extend out and stop from the other opposite end of the shaft hole 21*a*, to form an annular structure suspended to the human body. Through a rotation structure of the air outlet part 213 relative to the holding part 211, the cable 241 can be configured to extend out from one end of the shaft hole 21*a*, and extend in and stop from the other opposite end of the shaft hole 21*a*, to form a reliable annular structure. Stopping of the cable 241 in the shaft hole 21*a* is not limited to a button, an eccentric wheel, a sliding block, or the like. Details are not described herein again. In this implementation, the cable 241 penetrates the shaft hole 21*a*. When the annular structure of the cable 241 is suspended to the neck of the human body, the holding part 211 may be basically attached to the human body in a vertical direction, and is stable in stress, thereby preventing a vertex angle of the holding part 211 from frequently colliding with the human body due to tilting relative to a direction of gravity, and improving use comfort level.

Figure 13:
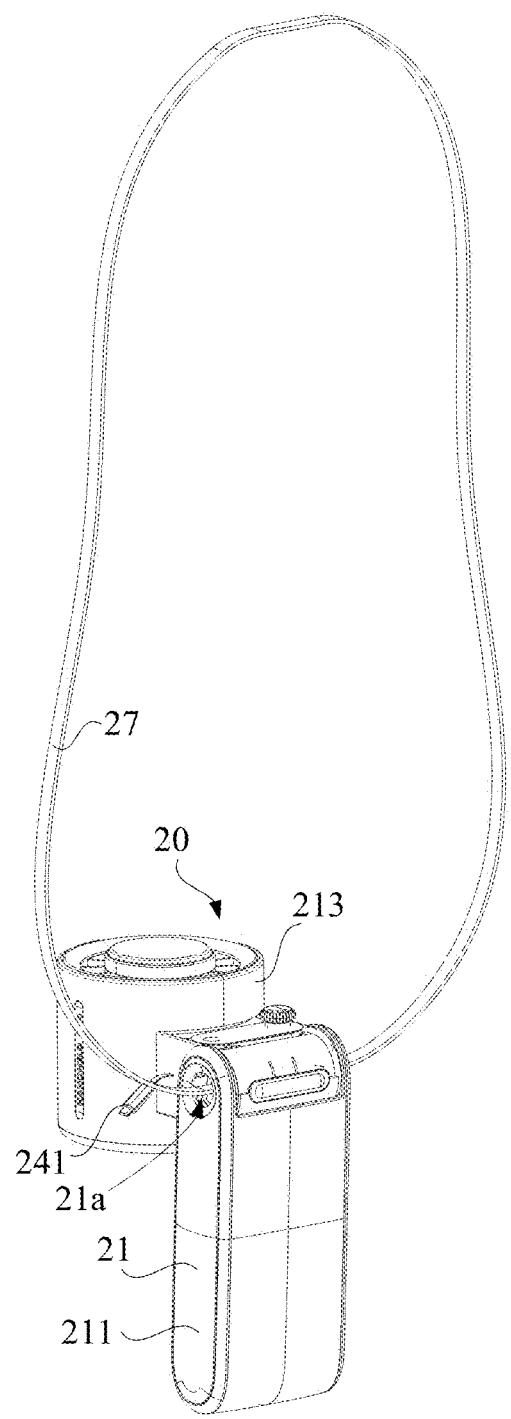
FIG. 13 is a schematic diagram of a third implementation of the handheld fan in the second embodiment.

Certainly, refer to FIG. 13. In an implementation in which at least one of the air outlet part 213 and the holding part 211 is provided with the shaft hole 21*a*, and the housing 21 may alternatively be not provided with a clamping structure. The handheld fan 20 may include a lanyard 27*a* that penetrates the shaft hole 21*a*, and the lanyard 27*a* is provided with an annular structure suspended to the human body. Use convenience of the handheld fan 20 can also be improved through the lanyard 27*a*, and a usage scenario of the handheld fan 20 is expanded. In addition, a complex clamping structure can be prevented from being disposed, thereby simplifying a structure of the handheld fan 20 and reducing manufacturing costs of the handheld fan 20.

The technical features of the foregoing embodiments can be employed in arbitrary combinations. For brevity of description, not all possible combinations of the technical features of the foregoing embodiments are described. However, the combinations of the technical features should be construed as falling within the scope described in this specification as long as there is no contradiction in the combinations.

The above described are merely several embodiments of the present disclosure. Although these embodiments are described specifically and in detail, they should not be construed as a limitation to the patent scope of the present disclosure. It should be noted that those of ordinary skill in the art can further make several variations and improvements without departing from the concept of the present disclosure, and all of these fall within the protection scope of the present disclosure. Therefore, the protection scope of the present disclosure shall be subject to the protection scope defined by the claims.

What is claimed is:

1. A handheld fan, comprising:
a housing;
a fan module disposed in the housing;
a power module disposed in the housing and configured to supply power to the fan module;
a retractable cable module disposed in the housing and comprising a cable that is retractable relative to the housing to be withdrawn into the housing or extended out of the housing, wherein the cable is configured to: connect to an external electronic device, and supply power to the external electronic device through the power module; and
a first circuit board disposed in the housing, the power module and the fan module are electrically connected to the first circuit board separately; wherein the retractable cable module comprises a second circuit board, the second circuit board is electrically connected to the first circuit board, and the cable is electrically connected to the second circuit board.

2. The handheld fan according to claim 1, wherein the housing comprises a holding part and an air outlet part connected to one end of the holding part, and the air outlet part is provided with an air outlet; the power module is disposed in one of the holding part and the air outlet part, one of the air outlet part and the holding part is provided with the fan module, and one of the holding part and the air outlet part is provided with the retractable cable module.

3. The handheld fan according to claim 2, wherein the holding part is fixed to the air outlet part.

4. The handheld fan according to claim 3, wherein the first circuit board is disposed in one of the holding part and the air outlet part.

5. The handheld fan according to claim 4, wherein the retractable cable module comprises a casing disposed in the holding part, positions of the casing and the first circuit board are fixed relative to each other, and the cable is disposed in the casing in a retractable manner.

6. The handheld fan according to claim 5, wherein the retractable cable module comprises a torsion spring, and a turntable that are disposed in the casing, positions of the second circuit board and the casing are fixed relative to each other; a first free end of the torsion spring is connected to the turntable, positions of a second free end of the torsion spring and the second circuit board are fixed relative to each other, the turntable is rotatably connected to the casing, and the cable is wound on a periphery of the torsion spring; and the cable is configured to pull the turntable to rotate relative to the casing to extend out of the casing, and the turntable is configured to drive the cable extending out of the casing to roll into the casing.

7. The handheld fan according to claim 6, wherein the retractable cable module comprises a clamping block rotatably connected to the casing, the turntable has a stopping position and an unlocking position, in a process of pulling the cable out of the casing, rotation of the turntable is limited by the clamping block when the turntable is driven by the cable to rotate to the stopping position for corresponding to the clamping block; and when the cable is continuously pulled out of the casing and is configured to drive the turntable to rotate, the clamping block is rotated relative to the casing and is moved to the unlocking position, making the cable roll into the casing.

8. The handheld fan according to claim 4, wherein the retractable cable module comprises a torsion spring and a turntable that is rotatably connected to one of the holding part and the first circuit board, a first free end of the torsion spring is connected to the turntable, positions of a second free end of the torsion spring and the first circuit board are fixed relative to each other, the cable is wound on a periphery of the torsion spring, the cable is configured to pull the turntable to rotate relative to the first circuit board to extend out of the holding part, and the turntable is configured to drive the cable extending out of the holding part to roll into the holding part.

9. The handheld fan according to claim 8, wherein the retractable cable module comprises a clamping block rotatably connected to one of the holding part and the first circuit board, the turntable has a stopping position and an unlocking position, in a process of pulling the cable out of the holding part, rotation of the turntable is limited by the clamping block when the turntable is driven by the cable to rotate to the stopping position for corresponding to the clamping block; and when the cable is continuously pulled out of the holding part and is configured to drive the turntable to rotate, the clamping block is moved relative to the turntable to the unlocking position, making the cable roll into the holding part.

10. The handheld fan according to claim 2, wherein the holding part is rotatably connected to the air outlet part.

11. The handheld fan according to claim 10, wherein the first circuit board is disposed in one of the air outlet part and the holding part.

12. The handheld fan according to claim 11, wherein the air outlet part comprises a fan cover and a mounting part connected to the fan cover, the fan cover is provided with the air outlet, the mounting part is rotatably connected to the holding part, and the first circuit board and the retractable cable module are disposed in the mounting part.

13. The handheld fan according to claim 12, wherein the retractable cable module comprises a casing disposed in the mounting part, positions of the casing and the first circuit board are fixed relative to each other, and the cable is disposed in the casing in a retractable manner.

14. The handheld fan according to claim 13, wherein the retractable cable module comprises a torsion spring, and a turntable that are disposed in the casing, positions of the second circuit board and the casing are fixed relative to each other; a first free end of the torsion spring is connected to the turntable, a second free end of the torsion spring is connected to the casing, the turntable is rotatably connected to the casing, and the cable is wound on a periphery of the torsion spring; and the cable is configured to pull the turntable to rotate relative to the casing to extend out of the casing, and the turntable is configured to drive the cable extending out of the casing to roll into the casing.

15. The handheld fan according to claim 14, wherein the retractable cable module comprises a clamping block rotatably connected to the casing, the turntable has a stopping position and an unlocking position, in a process of pulling the cable out of the casing, rotation of the turntable is limited by the clamping block when the turntable is driven by the cable to rotate to the stopping position for corresponding to the clamping block; and when the cable is continuously pulled out of the casing and is configured to drive the turntable to rotate, the clamping block is rotated relative to the casing and is moved to the unlocking position, making the cable roll into the casing.

16. The handheld fan according to claim 12, wherein the retractable cable module comprises a torsion spring and a turntable that is rotatably connected to one of the mounting part and the first circuit board, a first free end of the torsion spring is connected to the turntable, positions of a second free end of the torsion spring and the first circuit board are fixed relative to each other, the cable is wound on a periphery of the torsion spring, the cable is configured to pull the turntable to rotate relative to the first circuit board to extend out of the mounting part, and the turntable is configured to drive the cable extending out of the mounting part to roll into the mounting part.

17. The handheld fan according to claim 16, wherein the retractable cable module comprises a clamping block rotatably connected to one of the mounting part and the first circuit board, the turntable has a stopping position and an unlocking position, in a process of pulling the cable out of the mounting part, rotation of the turntable is limited by the clamping block when the turntable is driven by the cable to rotate to the stopping position for corresponding to the clamping block; and when the cable is continuously pulled out of the mounting part and is configured to drive the turntable to rotate, the clamping block is moved relative to the turntable to the unlocking position, making the cable roll into the mounting part.

18. The handheld fan according to claim 11, wherein both the retractable cable module and the first circuit board are disposed in the holding part.

19. The handheld fan according to claim 18, wherein the retractable cable module comprises a casing disposed in the holding part, and a torsion spring, and a turntable that are disposed in the casing, positions of the second circuit board and the casing are fixed relative to each other; a first free end of the torsion spring is connected to the turntable, positions of a second free end of the torsion spring and the second circuit board are fixed relative to each other, the turntable is rotatably connected to the casing, and the cable is wound on a periphery of the torsion spring; and the cable is configured to pull the turntable to rotate relative to the casing to extend out of the casing, the turntable is configured to drive the cable extending out of the casing to roll into the casing, positions of the casing and the first circuit board are fixed relative to each other, and the cable is disposed in the casing in a retractable manner.

20. The handheld fan according to claim 18, wherein the retractable cable module comprises a torsion spring and a turntable that is rotatably connected to one of the holding part and the first circuit board, a first free end of the torsion spring is connected to the turntable, positions of a second free end of the torsion spring and the first circuit board are fixed relative to each other, the cable is wound on a periphery of the torsion spring, the cable is configured to pull the turntable to rotate relative to the first circuit board to extend out of the holding part, and the turntable is configured to drive the cable extending out of the holding part to roll into the holding part.

21. The handheld fan according to claim 10, wherein at least one of the air outlet part and the holding part is configured to clamp with one end that is of the cable and that is extended out of the housing, to form an annular structure suspended to a human body.

22. The handheld fan according to claim 21, wherein at least one of the air outlet part and the holding part is provided with a shaft hole, an axis of rotation of the air outlet part relative to the holding part passes through the shaft hole, the cable is configured to extend out from one end of the shaft hole, and extend out and stop from an opposite end of the shaft hole, to form the annular structure suspended to the human body.

23. The handheld fan according to claim 10, wherein at least one of the air outlet part and the holding part is provided with a shaft hole, an axis of rotation of the air outlet part relative to the holding part passes through the shaft hole, the handheld fan comprises a lanyard that penetrates the shaft hole, and the lanyard has an annular structure suspended to a human body.

24. The handheld fan according to claim 1, wherein the cable comprises a cable body, a connection part, and a digital display part, the digital display part is connected between a free end of the cable body and the connection part, and the connection part is configured to connect to the external electronic device.

* * * * *